INVENTOR.
JOHN SANCHEZ
By Gordon H. Olson
ATTORNEY.

INVENTOR.
JOHN SANCHEZ
By Gordon H. Olson
ATTORNEY.

3,441,050
PRESSURE EQUALIZING VALVE
John Sanchez, Rowland Heights, Los Angeles, Calif., assignor to International Telephone and Telegraph Corporation, New York, N.Y., a corporation of Maryland
Filed July 13, 1966, Ser. No. 564,859
Int. Cl. F16k 17/26
U.S. Cl. 137—493.6                                6 Claims

ABSTRACT OF THE DISCLOSURE

The valve compensates for pressure changes both inside and outside a container. A movable valve seal is urged outwardly by an "under-pressure" spring against a movable valve member urged by an "over-pressure" spring. When pressure within the container exceeds a set maximum, the valve seat engages a fixed member so that further pressure forces the valve member away from the seat. Similarly, if an under-pressure condition exists within the tank, the valve seat and member are moved inwardly until the valve member is stopped, thus once more opening the valve.

---

This invention relates to a valve for controlling the pressure within a tank utilized for containing a volatile liquid to prevent the pressure within the tank from becoming too high or too low with respect to the outside pressure.

While the valve structure to be described herein may be employed to control pressure for a variety of fluids and in a variety of situations, it is particularly useful in connection with gasoline or fuel tanks for automobiles, trucks and other vehicles. Such vehicle gasoline tanks typically are not sealed and include a ventline for balancing or equalizing pressures between the tank and the exterior due to the volatile nature of the fuel. While this approach prevents pressure buildup, it unfortunately results in a loss of a certain amount of fuel. This, of course, is particularly true when the tank is full or nearly so, the temperature is rising, and the vehicle is moving.

Such loss of fuel is naturally wasteful and costly and is especially significant in view of the ever-increasing number of vehicles employed throughout the world, and the ever-increasing price of fuel to the consumer. Also, gaseous fumes and possibly some liquid escaping may present a hazardous situation from an explosion or fire standpoint if several vehicles having full tanks of fuel are located in areas where ventilation is poor and temperatures are high and rising. Gaseous fumes escaping into the atmosphere also add to the air pollution problem. While this may not seem like a large factor in most areas at present, the increasing population density and the growing number of vehicles will compound the effect.

Accordingly, it is a primary object of this invention to provide a unique pressure equalizing valve for controlling fluid pressure within a tank utilized for containing a volatile liquid.

It is another object of this invention to provide such a valve which will relieve pressure within a tank beyond certain limits and may be used in conjunction with an expansion chamber to prevent loss of fluid.

It is a further object of this invention to provide such an equalizing valve structure which will relieve both overpressure and underpressure situations.

Yet another object of this invention is to provide such a valve structure which is low in cost, easy to manufacture and performs reliably in low pressure situations.

In accordance with one form of the invention, the valve structure includes a valve body for mounting in the wall of a tank for containing fluid with the body having a passage extending therethrough. One end of the passage is open to the inside of the tank and the other end of the passage is open to the outside of the tank. A pressure responsive valve seat having a hole therethrough is positioned to be axially movable within the passage and includes sealing means preventing fluid flow between the valve body and the seat. A valve member is slidably mounted within the passage outwardly from the valve seat with the inner end of the valve member extending across the hole in the valve seat to control the passage of fluid through the hole. An underpressure spring urges the valve seat outwardly against the valve member, while an overpressure spring urges the valve member inwardly against the valve seat to insure positive sealing and leakage of fluid. If pressure increases within the tank, the valve seat is moved outwardly together with the valve member against the urging of the overpressure spirng means. A shoulder formed in the valve body limits the outward movement of the valve seat with the result that if the pressure within the tank continues to increase, the pressure acts against the inner end of the valve member forcing it outwardly from the valve seat, thereby opening the hole within the valve seat and allowing the pressure within the tank to be dissipated. As the pressure decreases, the valve member is once more forced inwardly under the urging of the overpressure spring to close the valve.

Since the fuel tank is essentially sealed, it is necessary that some provision be made for pressure reductions within the tank as well as pressure increases. If the internal pressure decreases as fuel is utilized or upon a decrease in temperature, the movable valve seat is drawn inwardly against the urging of the underpressure spring. By limiting the inward movement of the valve member by suitable stop means, the valve is once more opened allowing atmospheric pressure to enter the tank. Thus in this simple fashion, the pressure within the fuel tank can be easily controlled.

If desired, an expansion chamber positioned adjacent the main tank may be employed to receive any fluid passing outwardly from the valve during an overpressure situation. This fluid is then drawn back into the tank during an underpressure condition. Consequently, all fuel losses can be eliminated in this manner; and due to the low cost design of the valve, fuel savings easily justify its use. Moreover, all fuel vapor or fumes are prevented from entering the atmosphere.

Further features, objects and attendant advantages of the invention will become apparent with reference to the following description and drawings in which.

Figure 1:
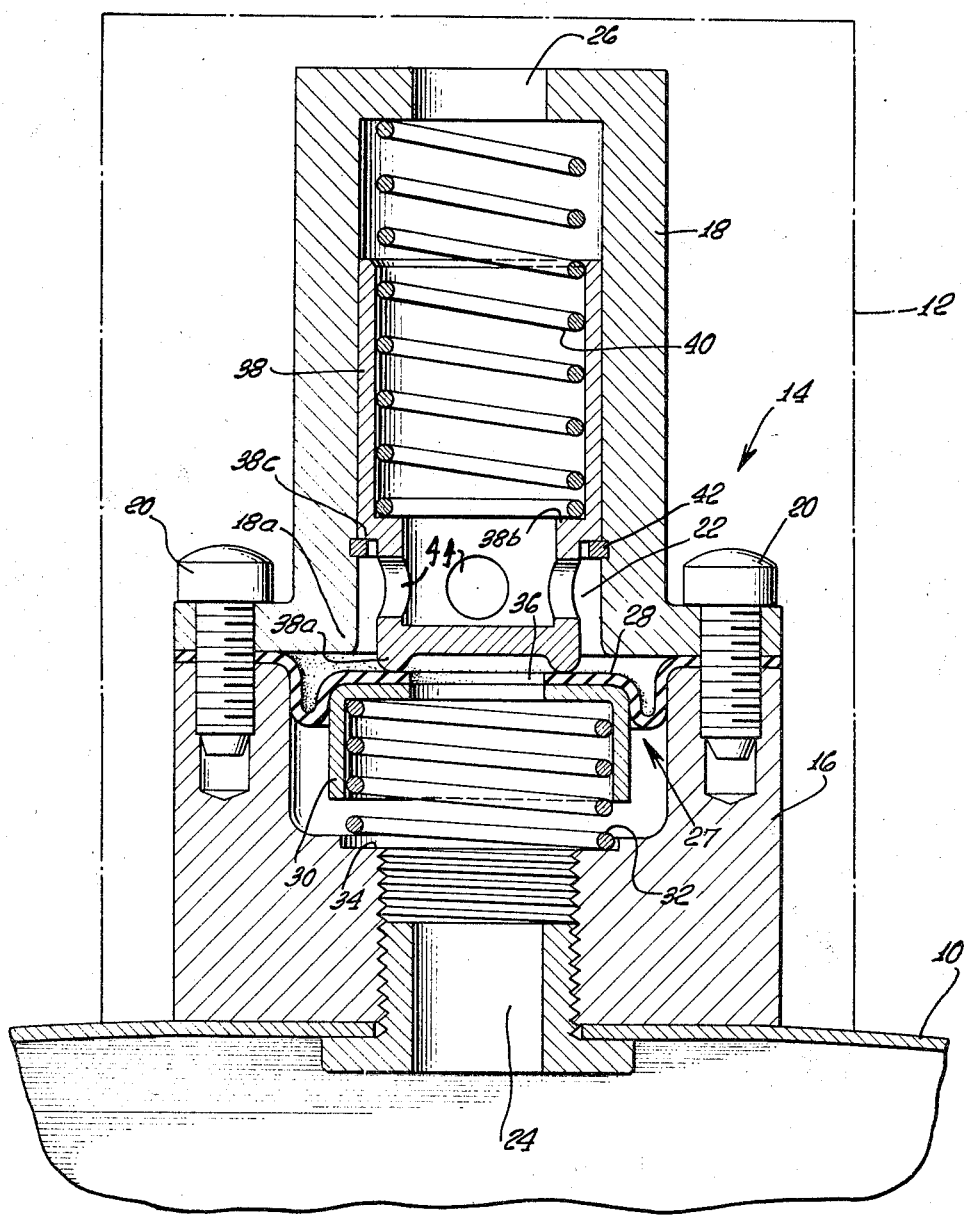
FIG. 1 is a cross-sectional view of the valve structure of the invention with the components shown in a balanced condition.

Referring now to FIG. 1, the valve of the invention is shown positioned in a wall of a fuel tank diagrammatically indicated at 10. Attached to the tank and surrounding the outer portion of the valve is an expansion chamber 12 which may be employed if desired to conserve or confine fuel escaping from the valve. Alternatively, the outer portion of the valve may be open to atmosphere.

The valve includes a main body 14 formed of an inner generally cup-shaped section 16 and an outer generally cup-shaped section 18, with their open ends secured by suitable fasteners 20. The valve body defines a passage 22 having an inner end 24 open to the interior of the tank and its opposite or outer end 26 open to the exterior of the tank into the expansion chamber or atmosphere, as the case may be.

A unique aspect of the valve structure is a movable valve seat 27 which includes a flexible diaphragm 28 clamped between the body sections 16 and 18 and extending across the main passage 22 through the valve body. The diaphragm 28 is centrally supported by a cup-shaped supporting element 30 having its open end extending towards the tank. A coil spring 32 referred to herein as an underpressure spring, is positioned within the supporting element with one end engaging the element and the other end engaging an annular groove or shoulder 34 formed in the valve body section 16 surrounding the inner end 24 of the passage 22. The spring urges the supporting element outwardly into engagement with the diaphragm. A centrally located hole 36 is formed in the supporting element and the diaphragm to permit fluid flow through the valve.

Another important structural feature of the valve is that the outward movement of the movable valve seat 27 is limited by the annular shoulder 18a formed by valve body section 18 in that the diameter of that shoulder is smaller than the diameter of the movable valve seat. Consequently the valve seat is forced into engagement with this shoulder as the valve seat is moved outwardly.

In the outer valve body section 18, there is slidably positioned a generally cup-shaped valve member 38 having its closed inner end formed with an annular ridge 38a surrounding the hole 36 in the valve seat 27 to cooperate with the valve seat for controlling the flow of fluid through the valve. The axially outer end of valve member 38 has a diameter which snugly slides within the body section 18 while the inner end of the valve member has a reduced diameter. This diameter change forms a shoulder or flange 38b on the interior of the valve body which forms a convenient surface for receiving one end of a coil spring 40. The opposite end of spring 40 engages the surface of body section 18 surrounding outer end 26. The diameter change in the valve member also forms a shoulder or flange 38c on the outer surface of the valve member which cooperates with a retaining ring 42 that serves as a stop to limit the inward movement of the valve member. One or more apertures 44 are formed in the side walls of the reduced diameter portion of the valve member to provide intercommunication between the valve outer end 26 and hole 36 in the valve seat when the valve is open.

*Operation*

The operation of the valve may be easily understood by reference to the various figures of the drawing which show the valve in its different operational positions. In FIG. 1, the pressure on the interior of the tank is approximately equal to the pressure of the exterior of the tank. Consequently, the valve is shown in a balanced condition with the movable valve seat 27 in engagement with the valve member 38 so that the valve is closed. Since the fluid pressures are balanced, the valve seat and the valve member are positioned solely by the springs 32 and 40. The overpressure spring 40 is selected to provide a greater axial force than the underpressure spring 30 so that the valve member 38 is forced to its innermost position as shown wherein its shoulder 38c engages the retaining ring 42.

Figure 2:
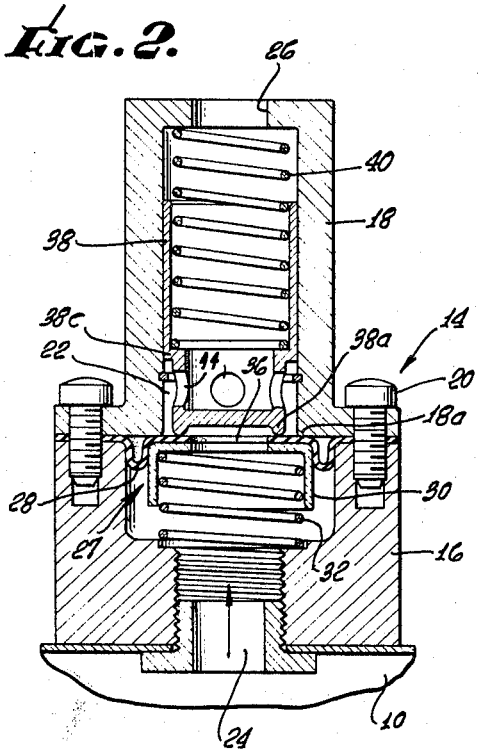
FIG. 2 shows the valve of FIG. 1 with the diaphragm shown in its outer position engaging a shoulder within the valve body.

Assume now that the tank 10 is filled with a volatile fluid such as gasoline and the ambient temperature is rising. This will cause vaporization of some of the gasoline, particularly if the tank is in a moving vehicle since the movement is likely to cause additional vaporization. If the tank were provided with a conventional vent line, both vapor or fumes and liquid would likely be lost to the atmosphere. However, with the unique valve structure of the invention, the increasing pressure within the tank initially, merely forces the moveable valve seat outwardly by acting against the diaphragm 28 as shown in FIG. 2. This outward movement of the valve seat is limited by shoulder 18a formed on the valve body section 18.

Figure 3:
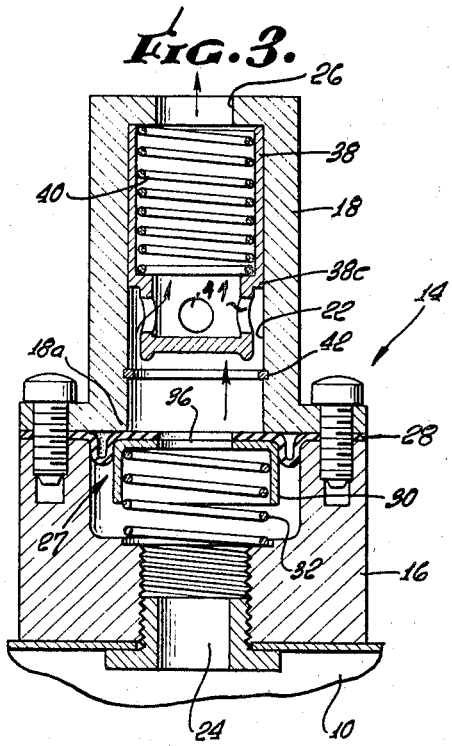
FIG. 3 shows the valve of FIG. 2 with the valve member moved further outwardly so that the valve is open.

If the fluid within the tank continues to expand, the further pressure increase will act against the inner end of valve member 38 through the hole 36 forcing the valve further outwardly, and thereby opening the valve as seen in FIG. 3. Consequently, the pressure is dissipated through the valve hole 36 and the apertures 44 into the surrounding expansion chamber or atmosphere. The valve member 38 is shown in its most extreme open position in FIG. 3 wherein its outer end engages the body section 18 surrounding the aperture 26. As the pressure is relieved within the tank, the overpressure spring 40 will once more force the valve member inwardly to close the valve and the components will return to the condition of FIG. 2 or FIG. 1.

Figure 4:
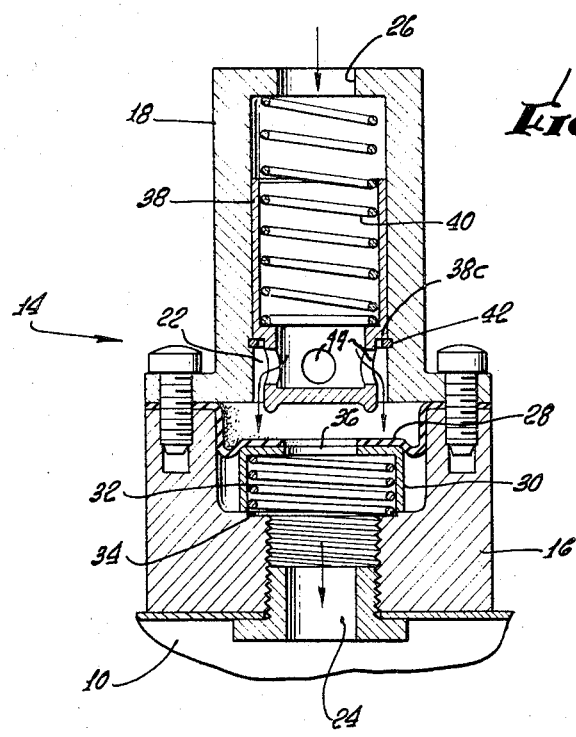
FIG. 4 shows the valve of FIG. 1 with the diaphragm moved to its inner position to correct an underpressure situation.

By merely employing an overpressure relief valve, the tank would remain effectively sealed at pressures below atmospheric pressure, which in effect would permit a partial vacuum to exist in the tank as the fuel is utilized or as the temperature decreases to cause a contraction of the fluid or condensing of the fuel vapor. Such condition could adversely affect the operation of the fuel pump utilized to conduct the fuel to the engine. With the unique valve structure of the invention, such condition is not allowed to exist in that as the pressure within the tank decreases below that of atmospheric pressure, the diaphragm 28 is forced inwardly against the urging of underpressure spring 32 as shown in FIG. 4. Since the inward movement of valve member 38 is limited by the stop-ring 42, the valve is opened as the valve seat 27 moves away from the valve member 38. With the valve once more opened, pressure is quickly equalized, so that the valve once more returns to its balanced position of FIG. 1.

Thus it can be seen that the valve functions to accommodate both underpressure and overpressure situations. The use of the flexible diaphragm and low force springs makes the valve responsive to low fluid pressure changes. For example, in a fuel tank application, the spring forces might be selected so that the valve opens to relieve an overpressure condition when the tank pressure is approximately 1.3 p.s.i above atmospheric pressure. While in the underpressure situation the valve may be set to open when tank pressure is approximately 0.3 p.s.i. below atmospheric. Since the valve structure is relatively simple, it can be mass produced in inexpensive fashion so that the cost of the valve can be quickly justified by virtue of fuel savings. Also, as pointed out above, the valve prevents possible dangerous situations arising from escaping fumes insofar as fire hazards are concerned and the valve helps reduce air pollution problems.

While only a single embodiment of the invention has been described and illustrated, it will be understood that various changes and modifications will readily come to the mind of one skilled in the art in view of this disclosure. Accordingly, it is intended that all such variations and modifications that fall within the true spirit and scope of the invention be included in the appended claims.

What is claimed is:
1. A pressure equalizing valve structure comprising:
   a valve body having a passage extending therethrough;
   means forming a pressure responsive valve seat in said passage having a hole extending therethrough and including seal means preventing fluid flow between the valve seat and the valve body;
   a valve member slidably mounted within said passage on one side of said valve seat with a portion of the member extending across said hole to control the opening and closing of the hole;
   spring means urging said valve member and said valve seat into sealing engagement;

said valve seat being axially movable in response to fluid pressure changes on said valve seat;

shoulder means formed in said valve body for limiting movement of said valve seat in one direction so that upon a relative increase of fluid pressure on said valve seat and on said portion of said valve member, said valve member is forced away from said valve seat thereby allowing pressure equalization between opposite sides of said valve seat through said hole;

and stop means in said valve body for limiting movement of said valve member in the opposite direction;

said valve seat being movable away from said valve member when said member engages said stop means in response to fluid pressure changes on said valve seat causing the valve seat to move in said opposite direction, thereby allowing pressure equalization through said hole, said valve member being generally cup-shaped having its own end slidably engaging the walls of said passage and having its closed end formed with radially inner and outer diameters smaller than those of said open end whereby interior and exterior shoulders are formed on said member by the diameter differences, said exterior shoulder being engageable with said stop means to limit the movement of said member toward said seat, and said spring means including a coil spring with one end engaging said interior shoulder and the other spring end engaging a surface of said body adjacent one end of said passage.

2. A pressure equalizing valve structure comprising:
a valve body having a passage extending therethrough;
means forming a pressure responsive valve seat in said passage having a hole extending therethrough and including seal means preventing fluid flow between the valve seat and the valve body;
a valve member slidably mounted within said passage on one side of said valve seat with a portion of the member extending across said hole to control the opening and closing of the hole;
spring means urging said valve member and said valve seat into sealing engagement;
said valve seat being axially movable in response to fluid pressure changes on said valve seat;
shoulder means formed in said valve body for limting movement of said valve seat in one direction so that upon a relative increase of fluid pressure on said valve seat and on said portion of said valve member, said valve member is forced away from said valve seat thereby allowing pressure equalization between opposite sides of said valve seat through said hole;
and stop means in said valve body for limiting movement of said valve member in the opposite direction;
said valve seat being movable away from said valve member when said member engages said stop means in response to fluid pressure changes on said valve seat causing the valve seat to move in said opposite direction, thereby allowing pressure equalization through said hole, said valve member being generally cup-shaped having its open end slidably engaging the walls of said passage and having its closed end formed with a reduced diameter spaced from the passage walls, aperture means formed in the side walls of the closed end of said member for providing intercommunication between the end of said passage and said hole.

3. A pressure equalizing valve structure comprising:
a valve body having a passage extending therethrough;
means forming a pressure responsive valve seat in said passage having a hole extending therethrough and including seal means preventing fluid flow between the valve seat and the valve body;
a valve member slidably mounted within said passage on one side of said valve seat with a portion of the member extending across said hole to control the opening and closing of the hole;
spring means urging said valve member and said valve seat into sealing engagement;
said valve seat being axially movable in response to fluid pressure changes on said valve seat;
shoulder means formed in said valve body for limiting movement of said valve seat in one direction so that upon a relative increase of fluid pressure on said valve seat and on said portion of said valve member, said valve member is forced away from said valve seat thereby allowing pressure equalization between opposite sides of said valve seat through said hole;
said stop means in said valve body for limiting movement of said valve member in the opposite direction;
said valve seat being movable away from said valve member when said member engages said stop means in response to fluid pressure changes on said valve seat causing the valve seat to move in said opposite direction, thereby allowing pressure equalization through said hole, said valve body including a first section and a second section each of which are generally cup-shaped with their open ends being secured together and their interiors forming said passage, the inner diameter of said first section being smaller than the inner diameter of the second section, and said means forming said valve seat includes a rigid element having a diameter larger than the inner diameter of said first body section so that the interior end of said first section forms said shoulder means engageable by said valve seat.

4. A pressure equalizing valve structure for controlling pressure within a tank containing a volatile liquid, said structure comprising:
a valve body to be mounted in the wall of said tank having a passage extending therethrough with one end of the passage open to the inside of the tank and the other end of the passage open to the outside of the tank;
a valve seat having a hole therethrough including a flexible element supported by said body, extending across said passage and being axially moveable in the passage;
a valve member slidably mounted within said passage outwardly from said element with the inner portion of the member extending across said hole to control the opening and closing of the hole;
overpressure spring means urging said valve member toward said valve seat;
said valve seat being urged outwardly against the inward force of said overpressure spring means upon a predetermined increase of pressure within said tank;
shoulder means formed in said valve body for limiting the outward movement of said valve seat so that a further pressure increase in said tank acts against said inner portion of said member to cause said valve member to be forced outwardly from said valve seat thereby allowing pressure relief through said hole from said tank;
underpressure spring means urging said valve seat outwardly into engagement with said valve member;
and stop means in said valve body for limiting inward movement of said valve member;
said valve seat being moveable inwardly away from said valve member when said member engages said stop means and upon a reduction of pressure within said tank great enough to overcome the outward force of said underpressure spring means, thereby allowing pressure relief inwardly through said hole into said tank, said overpressure spring means providing a greater axial force than said underpressure spring means so that when fluid pressure on opposite sides of said flexible element are equal, said valve member is in contact with said stop means and said valve seat is urged into sealing engagement with said valve member, said flexible element being a diaphragm and said valve seat including a generally cup-shaped supporting element opening towards said tank and supporting said diaphragm and said underpressure spring means being a coil spring having one end engaging the interior surface of said supporting element and the opposite end of said spring engaging a surface of said body adjacent the interior end of said passage.

5. A pressure equalizing valve structure for controlling pressure within a tank containing a volatile liquid, said structure comprising:

a valve body to be mounted in the wall of said tank having a passage extending therethrough with one end of the passage open to the inside of the tank and the other end of the passage open to the outside of the tank;

a valve seat having a hole therethrough including a flexible element supported by said body, extending across said passage and being axially moveable in the passage;

a valve member slidably mounted within said passage outwardly from said element with the inner portion of the member extending across said hole to control the opening and closing of the hole;

overpressure spring means urging said valve member toward said valve seat;

said valve seat being urged outwardly against the inward force of said overpressure spring means upon a predetermined increase of pressure within said tank;

shoulder means formed in said valve body for limiting the outward movement of said valve seat so that a further pressure increase in said tank acts against said inner portion of said member to cause said valve member to be forced outwardly from said valve seat thereby allowing pressure relief through said hole from said tank;

underpressure spring means urging said valve seat outwardly into engagement with said valve member;

and stop means in said valve body for limiting inward movement of said valve member;

said valve seat being moveable inwardly away from said valve member when said member engages said stop means and upon a reduction of pressure within said tank great enough to overcome the outward force of said underpressure spring means, thereby allowing pressure relief inwardly through said hole into said tank;

a sealed expansion chamber in communication with the outer end of said passage for receiving any fluid forced outwardly through said valve from said tank. said valve being arranged with respect to said expansion chamber such that fluid within the chamber will be drawn back into the tank when an underpressure condition exists within the tank causing the valve to open.

6. The structure of claim 4 wherein the tank end of said supporting element is engageable with said surface to limit the inward movement of said valve seat.

References Cited
UNITED STATES PATENTS

| | | | |
|---|---|---|---|
| 2,016,278 | 10/1935 | Ehlers | 137—493.6 |
| 2,345,547 | 3/1944 | Roth et al. | 137—493.6 XR |
| 2,571,667 | 10/1951 | Bondurant | 137—493 |

M. CARY NELSON, *Primary Examiner.*

R. J. MILLER, *Assistant Examiner.*